United States Patent
Gould et al.

(10) Patent No.: US 7,321,093 B2
(45) Date of Patent: Jan. 22, 2008

(54) USER INTERFACE FOR SIMULTANEOUS MANAGEMENT OF OWNED AND UNOWNED INVENTORY

(75) Inventors: Eric J. Gould, San Jose, CA (US); Nick West, Austin, TX (US); Donald McCaskill, Austin, TX (US); Alice Cark, Austin, TX (US); Paulus Trisnadi, Austin, TX (US)

(73) Assignee: Blue Dolphin Solutions LLC, Las Vegas, NV (US)

( * ) Notice: Subject to any disclaimer, the term of this patent is extended or adjusted under 35 U.S.C. 154(b) by 0 days.

(21) Appl. No.: 11/512,894

(22) Filed: Aug. 29, 2006

(65) Prior Publication Data

US 2006/0288848 A1 Dec. 28, 2006

Related U.S. Application Data

(63) Continuation of application No. 10/696,379, filed on Oct. 29, 2003, now Pat. No. 7,173,177, which is a continuation of application No. 09/473,901, filed on Dec. 28, 1999, now Pat. No. 6,693,236.

(51) Int. Cl.
*G10H 1/00* (2006.01)
*G10H 1/18* (2006.01)
*G10H 7/00* (2006.01)

(52) U.S. Cl. ............. 84/615; 84/477 R; 705/26; 700/214

(58) Field of Classification Search .............. 84/477 R, 84/600, 615, 653; 705/26–29; 434/307 A; 700/214, 234; 369/30.08, 30.09; 715/744–748
See application file for complete search history.

(56) References Cited

U.S. PATENT DOCUMENTS

| | | | |
|---|---|---|---|
| 5,970,474 A * | 10/1999 | LeRoy et al. | 705/27 |
| 6,243,725 B1 * | 6/2001 | Hempleman et al. | 715/530 |
| 6,618,753 B2 * | 9/2003 | Holland et al. | 709/217 |
| 2002/0059120 A1 * | 5/2002 | Milton | 705/28 |

* cited by examiner

*Primary Examiner*—Jeffrey W Donels

(57) ABSTRACT

The present invention provides a user configurable computer interface for managing inventory. The interface provides a list, generated according to a user-defined organization. The list includes both owned and un-owned items and provides a means for sampling and purchasing the un-owned items directly from the list. The present invention contemplates a user interface for managing an entertainment play lists such as music play lists, video play lists etc. In addition the present invention contemplates management of vehicle maintenance and goods such as groceries, toys, or books.

21 Claims, 8 Drawing Sheets

USER INTERFACE FOR SIMULTANEOUS MANAGEMENT OF OWNED AND UNOWNED INVENTORY

This application is a continuation of U.S. patent application Ser. No. 10/696,379 filed on Oct. 29, 2003 now U.S. Pat. No. 7,173,177, entitled "USER INTERFACE FOR SIMULTANEOUS MANAGEMENT OF OWNED AND UNOWNED INVENTORY", which is a continuation of U.S. patent application Ser. No. 09/473,901, filed Dec. 28, 1999, now U.S. Pat. No. 6,693,236, issued Feb. 17, 2004.

BACKGROUND OF THE INVENTION

The present invention relates to management of inventory. More particularly the present invention relates to maintaining an inventory of items through use of a user interface incorporating a user customized organization wherein both owned and un-owned items can be processed simultaneously and wherein un-owned items can be purchased directly from the user interface.

With reference to FIG. 1, the traditional processes of maintaining a supply of goods or services, and purchasing those goods or services involves several discrete steps. While most people do not consciously think about it, the process of shopping for goods involves a complex procedure which is understood more clearly with reference to FIG. 1. First, in a step 102, a shopper must determine certain goods are needed and then, in a step 104, must either remember that the goods are needed, or must add them to a list of such needed items. In a step 106 the shopper must determine whether either of two conditions are met. First, are there sufficient articles in the list to justify traveling to a store, and second is there at least one item in the list which is needed with sufficient urgency to justify a trip to the store regardless of the size of the list. If the answer to either of these questions is no then the shopper returns to the step 102 of determining that further items are needed and adding them to the list. However, if the answer to either of these questions is yes, then the shopper, in a step 108, determines a first item to search for and a first store in which that item is most likely to be found.

Once at the first store, in a step 110 the shopper searches for the first item. As any shopper will appreciate, in a traditional shopping experience, the process of searching a store for a particular item is dictated by the vendor's organization of goods. For example, while the shopper may have compiled a shopping list in which all of the items necessary to make a spaghetti dinner may be grouped together, the store may have items arranged in any number of organizations. The sauce may be in one isle with canned vegetables, while spaghetti noodles are in another isle, and red wine in yet another. Finding the Parmesan cheese is always a problem. To further exacerbate the problem one store often organizes its stock differently from another store.

With continued reference to FIG. 1, in a step 112, once the item is found it is placed in a cart. Then in a step 114 the shopper directs his or her attention to the next sequential item on the list. At this point, in a step 116, the shopper must check the list to determine whether all of the items have been obtained. If the answer is yes then, in a step 118, the shopper proceeds to the check out counter and purchases the item or items in the cart. If the answer to the step 116 is no, then the user proceeds to step 120 to determine whether the remaining article or articles can be purchased at that store. If it can, the shopper returns to the step 110 to search for that item. If the item cannot be found there, then in a step 122, the shopper proceeds to the checkout stand to purchase any items accumulated in the shopping cart. Then in a step 124, the shopper travels to the next store to resume the search step 110. This process continues until all of the items on the list have been obtained.

It will be appreciated that the traditional method of shopping is somewhat cumbersome and time consuming. The process becomes still more difficult if the shopper has a small child to attend to or has a physical impairment which makes travel to and movement within the stores difficult.

With the advent of the Internet and on-line shopping, the process has been made somewhat easier. However, the Internet shopping has essentially maintained the traditional shopping model, with the only real difference being that the shopper does not have to physically travel from one store to another. The online shopper still must compile a list of goods needed and then in a separate step, must go to various Internet sites to shop for those goods. Once at the site the shopper must search for the goods which are organized according to the vendor's chosen organization, which can vary from vendor to vendor. The on-line shopper fills a virtual shopping cart with goods and, when the items remaining on the shopper's list are not available at that Internet site, the shopper must proceed to another site to finish the list.

Another system which has been developed in an attempt to streamline the shopping experience is the use of bridal registries. Such a registry contains a list of items which a couple desires to own. As friends and family purchase items on the list, the list is constantly updated to indicate which items have been purchased and which items remain to be purchased. However, such a system suffers the drawback that it is only useful for one store and the buyer must go to the store to access the system. In addition, the once an item has been selected from the list, the buyer must purchase the item as a separate, discrete activity. This purchase is generally performed as according to the conventional shopping experience in which the shopper must find the item in the store, using the stores inventory organization, and then must make the purchase in a conventional manner at check out stand or the like.

From the forgoing it is apparent that there remains a need for a new shopping paradigm. Such a shopping paradigm would preferably include a system which would take full advantage of the vast power of computers and of the Internet to eliminate many of the steps required to maintain an inventory of goods or services. Such a system would also preferably provide a tool allowing the shopper to organize goods in a manner most useful to the shopper, would identify for the user which items need to be purchased and would allow the user to purchase each item individually directly from the user customized organizational tool.

SUMMARY OF THE INVENTION

The present invention provides a system method and apparatus for allowing a computer user to maintain an inventory of goods or services in an organization which is customized to the user's individual needs. The organized items include both those items owned by the user and those which need to be purchased, and the user is provided with an indication of which items fall into which category, allowing the user to easily determine which items remain to be purchased. Purchase can be made directly by selecting the needed item without requiring the user to compile a list of items and without visiting different vendors to purchase all needed items.

More particularly, the invention includes a user interface which displays a plurality of category icons each of which represents a user defined grouping of items. These items and groupings are organized in any manner designed by the user. Selecting one of the category icons causes the items within that group to be displayed with an associated status icon. The status icon associated with each item indicates to the user whether the item is currently owned by and available to the user, whether it needs to be purchased, or whether it has been purchased but has not yet been received.

Selecting an item having a status icon indicating that it needs to be purchased will cause a window to be displayed which includes a description of at least one such item available for purchase along with a mechanism for purchasing the item. The item window can include information such as price, availability, size, graphics, etc. The purchase mechanism can be in the form of a button which the user can select to initiate an on-line purchase. The selection of vendors can be preprogrammed, determined in real time, or can be by default, however, the system automatically determines which stores supply the item and provides a link to only those stores.

One embodiment of the invention provides a mechanism for managing a music portfolio. The system can be directly connected with the user's stereo system and includes user defined play lists. The play lists can be organized in any manner chosen by the user for example genre, artist, instrument, etc. A selection of lists identified by list icons is displayed from which the user can select a desired list. Selecting a desired list causes the musical titles within that list to be displayed. Each title includes a status icon which indicates whether the title is currently owned or needs to be purchased. By selecting an item to be purchased, the user accesses a window containing information regarding the title and a button for initiating a purchase of the musical title. The purchase can be, for example, in the form of downloaded MP3 music or can be on compact disc delivered via a conventional carrier. The lists are transferable so that a user can receive from a friend a list of, for example, party music. When the list is displayed in the user interface, it will indicate which of the items are already owned by the user and which have yet to be purchased.

In another embodiment of the invention, the user interface can be used to maintain a stock of groceries. Again the groceries can be organized in any manner chosen by the user. The groceries are displayed in user customized lists with an indication of which items remain to be purchased. Selecting an item to be purchased opens an item description window and provides for a direct on-line purchase.

In yet another embodiment of the invention, the user interface allows a user to easily manage vehicle maintenance. Each vehicle owned by the user is provided with its own icon, selection of which will provide the user with information regarding the maintenance schedule of that vehicle. The system keeps track of maintenance already performed and alerts the user when maintenance is due. The system also provides the user with a selection of service stations from which such service can be provided and also provides the user with links to the service station to schedule such maintenance.

These and other advantages of the invention will become apparent to those skilled in the art upon a reading of the following descriptions of the invention and a study of the several figures of the drawing.

DETAILED DESCRIPTION OF THE EMBODIMENTS

The present invention provides a system, method and apparatus for managing, organizing and purchasing items using a personalized user interface on a computer system. The user interface includes one or more customized lists, capable of displaying a selection of items of mixed ownership. More particularly, the list provides an indication of whether or not the item is already owned by the user and the user interface provides a mechanism for purchasing those items that are not.

Figure 2:
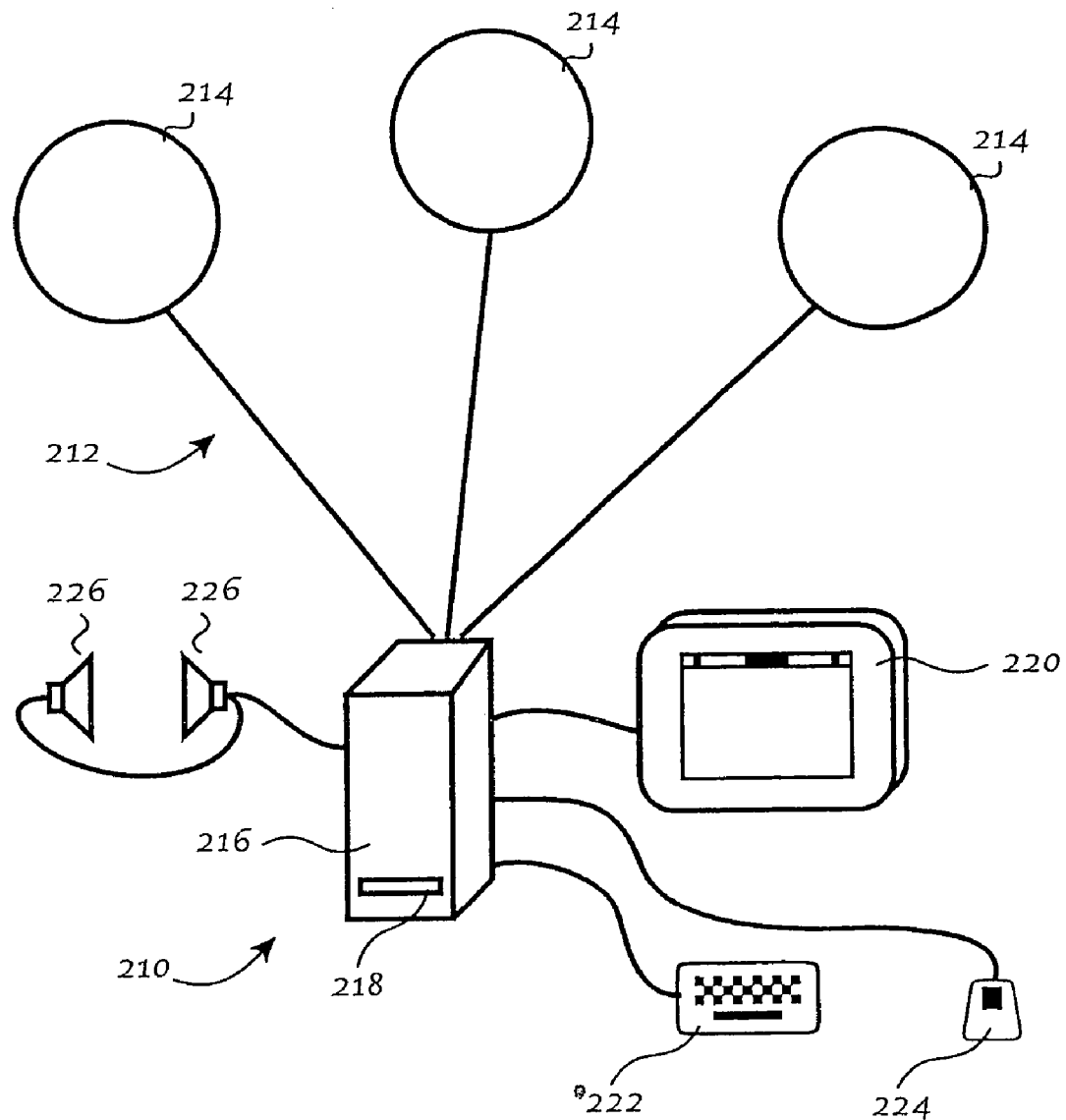
FIG. 2 is a schematic view of a computer system useful with the present invention.

With reference to FIG. 2, the present invention includes a software-based set of computer executable instructions for use with a computer system 210. The computer system 210 is preferably connected for communication with a computer network 212 including a plurality of remote agents 214. The computer network can be for example a local area network (LAN) or can be Internet based.

With continued reference to FIG. 2 the computer system preferably includes a computer 216 including a central processing unit, random access memory (RAM) (not shown), read only memory (ROM) (not shown) and one or more drives 218 which can be in the form of a magnetic floppy disk drive, laser disk etc. The computer system 10 also includes a video monitor 220 for visually displaying data to the user, a keyboard 222 for manually entering data, and a computer mouse or trackball 224 for manipulating data in coordination with the visual display provided by the monitor 220. A set of speakers 226 can also be provided and connected with the computer 216.

The software based computer executable instructions can be loaded into the computer 216 through the drive 218 or can be accessed through the network 212 from one or more of the remote agents 214. Once loaded the software instructions can be stored in the RAM, ROM, on a magnetic or laser disk accessed by the drive 216 or can be maintained on one of the agents 214. While the invention has been described in terms of use a personal computer, those skilled in the art will recognize that the present invention can be used in connection with other similar electronic equipment such as a hand held device, a laptop computer, etc.

Figure 3:
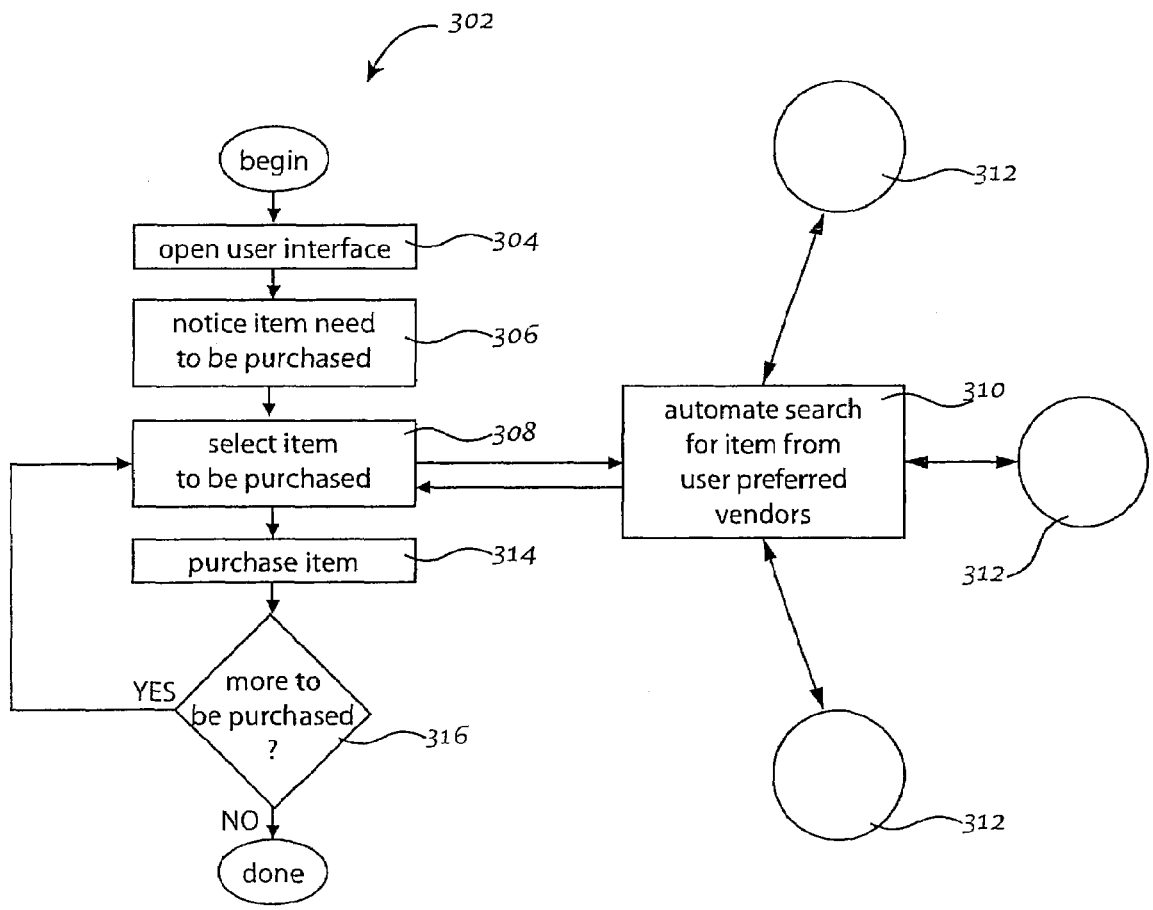
FIG. 3 is a process flow chart illustrating a shopping method of the present invention.

With reference to FIG. 3, an improved shopping method 302 will be described. The process 302 begins with a step 304 in which the user opens the software. Upon activation, the software will provide the user with at least one user defined list of items. The list includes and indication to the user of which items are already owned and which need to be purchased. Therefore, after activating the software, in a step 306, the user will readily notice which items, if any, need to be purchased. In a step 308, the user selects an item to be purchased. In a step 310, the software automatically searches for on-line vendors from among the agents 14 (FIG. 2) which can provided the item, preferably focusing on certain user preferred vendors 312. Then, in a step 314, the user purchases the item. In a step 316, the user checks the software to determine whether additional items remain to be purchased. If so then the user returns to step 308, if not then the user is done.

Figure 1:
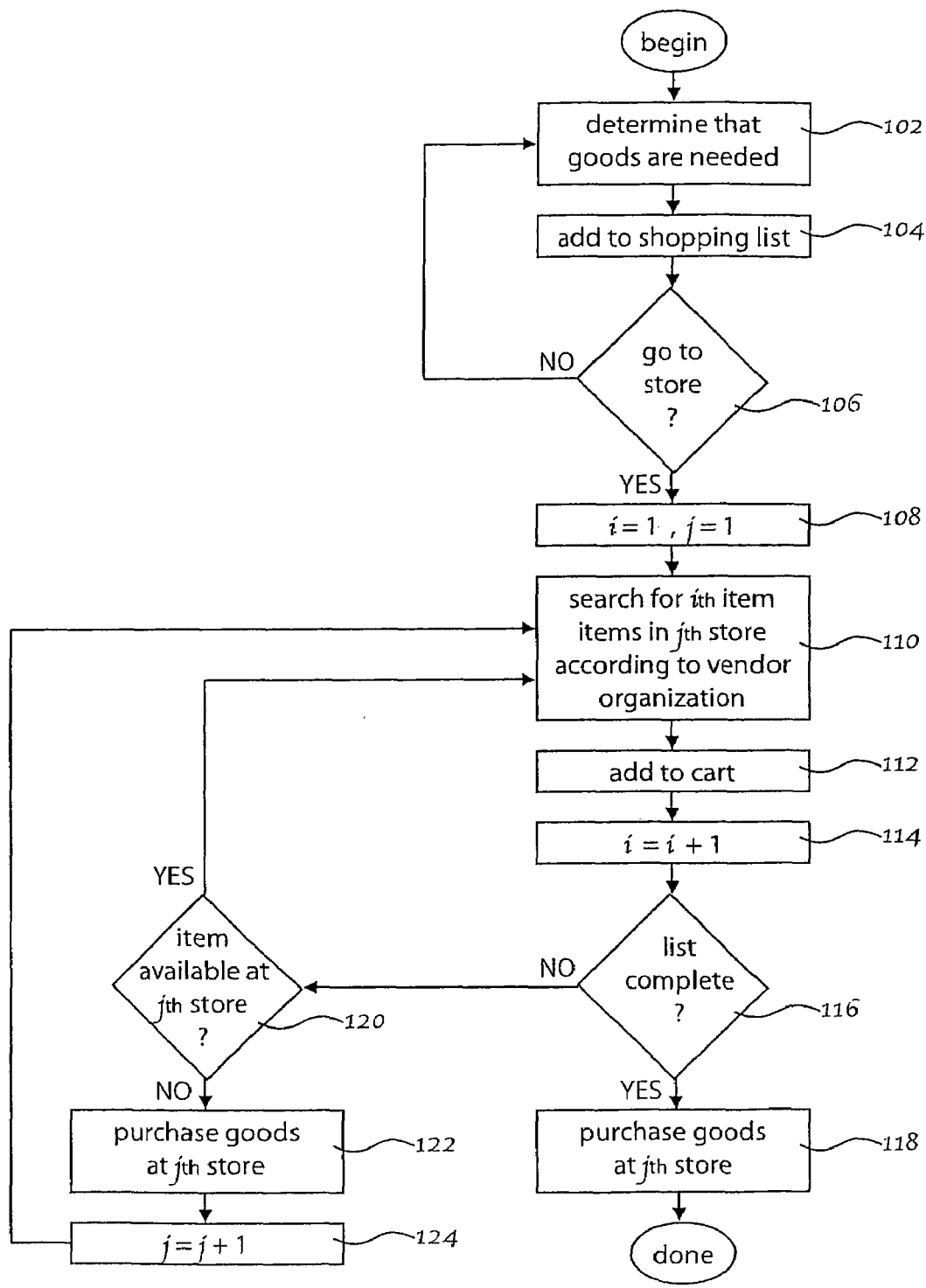
FIG. 1 is a process flow chart illustrating a shopping method of the background art.
Figure 4:
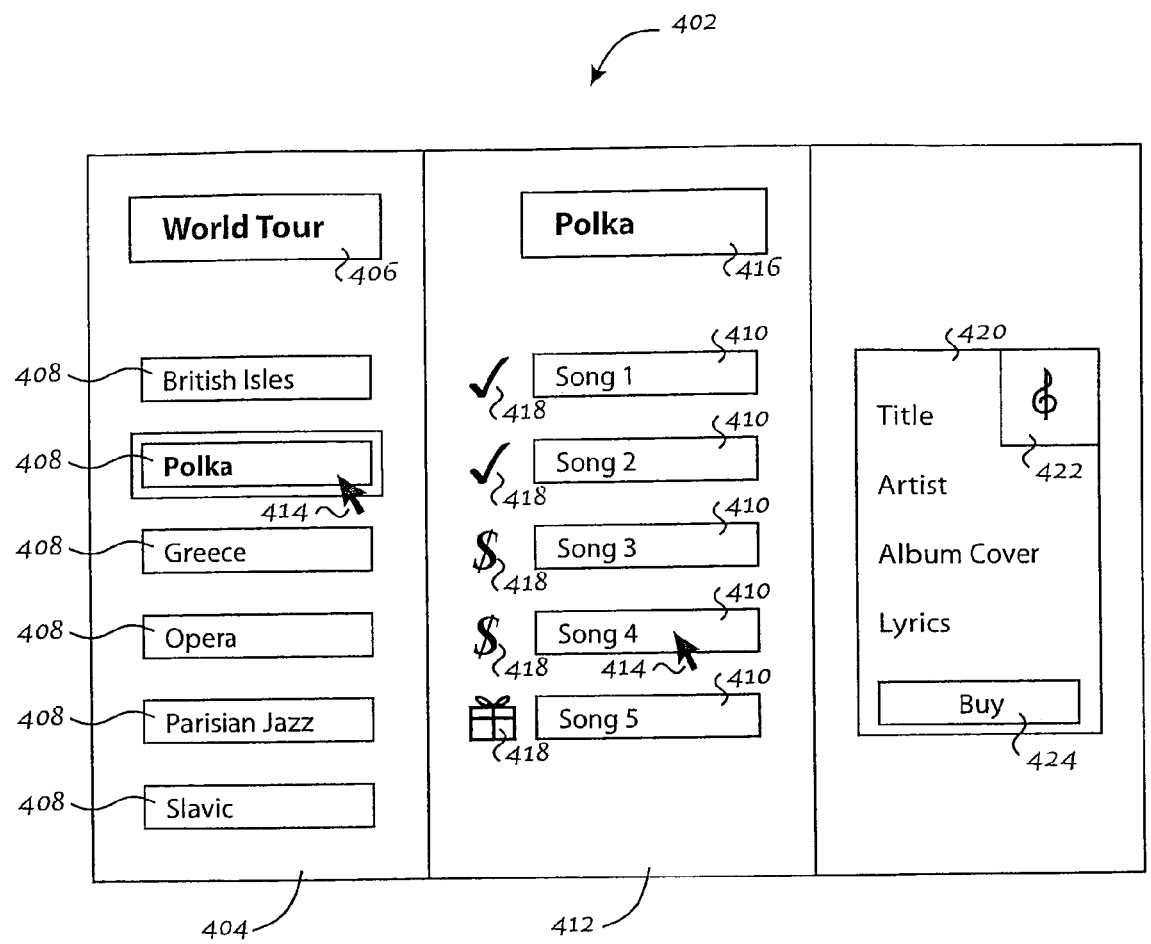
FIG. 4 displays a user interface according to an embodiment of the present invention.

With reference to FIG. 4, an embodiment of the invention includes a user interface 402 which can be displayed on the computer monitor 220 (FIG. 1) and can be considered to include three basic window regions. In the first region 404, a selection of lists is displayed. The nature of the lists is indicated by a heading 406, which can be an expression generated by the user or can be a default heading.

Each list is represented in the first window region 404 by a list icon 408, and the heading 406 corresponds to the category of lists displayed. The organization and categorization of lists can be tailored by the user to fit with his or her mindset and experiences. For example if the user had just returned from an extended vacation in which several countries had been visited, the user might generate a heading entitled "World tour". Under this heading there could be a set of lists 408, in the form of play lists or libraries, each containing music reminding him or her of specific locations visited. In such a case, the lists falling under the heading "World Tour" might have names such as "British Isles", "Polka", "Greece", etc. The user interface 402 is very flexible so that the organization need not be consistent and need not make sense to anyone other than the user. For instance, in the example above the lists seem inconsistent because "British Isles" and "Greece" are locations while "Polka" is a style of music. While this organization might seem inconsistent to most people it might make sense to the user.

With continued reference to FIG. 4, the user can select one of the lists 408, in which case a selection of items 410 contained in that list will be displayed in a second window region 412. Selection of list can be made using a pointer icon 414 controlled by the mouse 224 (FIG. 2) or can be by another method such as scrolling through the list icons using the keyboard 222 (FIG. 2) or a remote control (not shown). When a particular list 408 is selected in region 412, the name of the list appears at the top of the second window region as a list heading 416. A selection of items 410 in the form of musical titles making up the selected list 408 will appear below the list heading 416.

With reference still to FIG. 4, a title status icon 418 appears next to each listed title 410 displayed in the second region 18. These icons 42 indicate the status of the item in the list. For example a check mark, might appear next to an item to indicate that the item is already in the possession of the user. Another icon, for example a dollar sign, might appear next to items which have not yet been purchased. Another possible icon, for example mail package symbol, might appear next to an item which has been purchased but not yet received.

With continued reference to FIG. 4, selecting one of the title icons 410 will initiate various activities depending upon the status of the item. For example, if a title has not yet been purchased, selecting that title will cause information regarding that title, such as artist, record label, and album cover graphics, etc., to be displayed in a title description window 420. A "sample" icon 422 will be displayed which will initiate a sample play of the music, and a "buy" icon 424 will also be displayed, selection of which will initiate a purchase of the title.

If the title 410 selected is already owned and possessed by the user, selection of the title 410 will initiate play of the title. On the other hand if the status of the title is that it has been purchased but not yet received, then selection of the title will initiate a delivery information window (not shown) which might include data such as carrier, estimated time of arrival, whether it will be delivered C.O.D., etc.

The present embodiment can be used with music which can be downloaded directly from a network such as the Internet using MP3 or similar technology. In such an application, a status of condition of "purchased but not received" would have limited applicability. Alternatively, the present embodiment can be used with music recorded on compact discs or the like which must be purchased and delivered. In such a situation, the "purchased but not received" status condition is useful in indicating that while the title can not be played no purchase is necessary. It should be noted that the present embodiment contemplates that the term "title" applies to either a single song or an entire album as determined by user preference.

The present embodiment is an integral part of the user's home entertainment system. Selecting the list heading 416 in the second window region 412, will activate play of all of the titles 410 of the list which are currently in the possession of the user. These titles 410 can be played through the user's stereo system (not shown) or through the user's computer system 216 through speakers 226 (FIG. 2).

Figure 5:
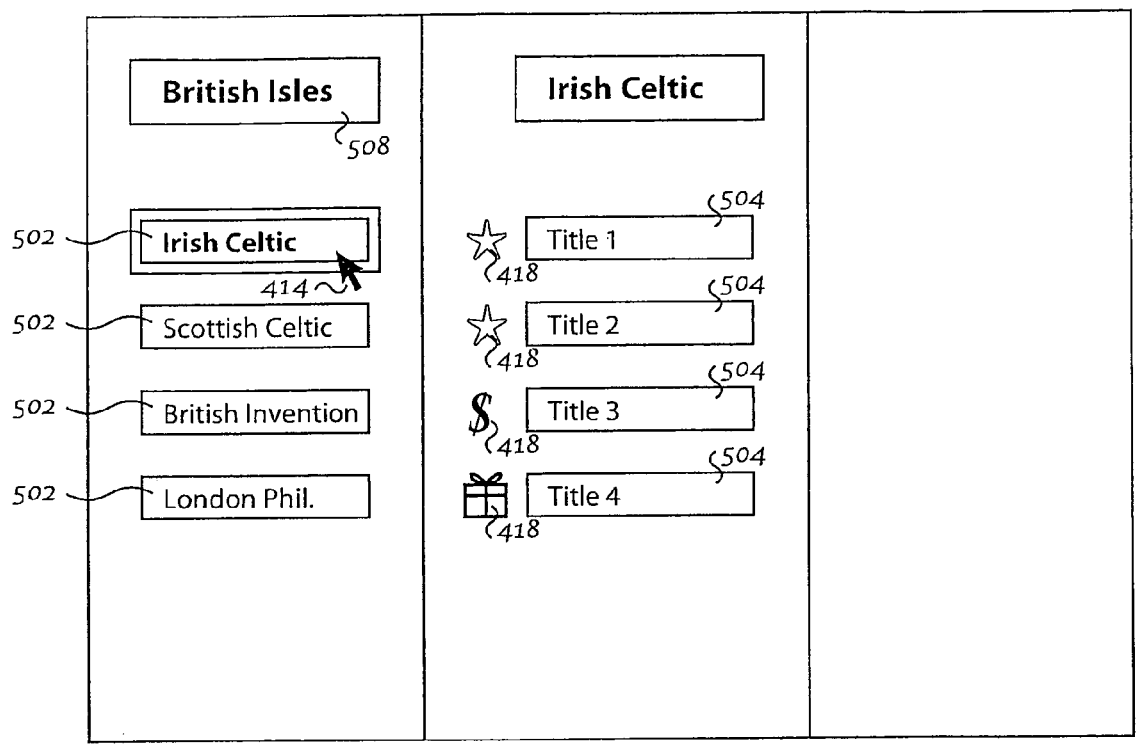
FIG. 5 displays a user interface according to an alternate embodiment of the invention.

With reference to FIG. 5, to further illustrate the organizational flexibility of the user interface, a particular list can have nested in it other lists. For example, a list entitled "British Isle" might include other nested lists 502 such as "Irish Celtic", "Scottish Celtic", "British Invasion" and "London Philharmonic". Selecting the British Isles list icon 408 (FIG. 4), would cause the nested list icons 502 to appear, selection of which would generate an array of titles 504 falling within that nested list 502. The titles 504 would have corresponding status icons 418 and purchase or play of the titles would be provided for as previously described.

With reference again to FIG. 4, a list 408 can be transferred between the user and one or more of the remote agents 214 (FIG. 2). For example, the user can request from and receive from a friend a list 408 of party songs. The titles 410 on the list 408 will appear with an indication of which titles are already owned and which need to be purchased.

Similarly, with reference to FIG. 5, the user can send one of his embedded list titles 508 to a music dealer as an empty list with a request to fill the lists with titles matching those categories. The music dealer can then fill the user's embedded list 502 with a list 504 that matches the user's categorization. This dealer supplied list 504 could include all inventory in that category or a filtered subset thereof. From this list, the user can contract the list to show just those items which are already owned by the user, only those which are not owned or some user defined combination thereof. Therefore, upon receiving the filled list from the music dealer, the user can, upon a simple inspection of the status icons 504, determine whether he or she already owns each of the items suggested by the dealer. The user can then select an un-owned title 504, listen to a sample of the music, and, if desired, purchase the title 504.

With reference to FIG. 4, the transferability of the lists 408 can also be useful in other ways. For example, if a user's friend has compiled a list of music he likes to listen to while driving he or she can transfer that list to the user. Upon a quick inspection of the status icons 418, the user can determine whether any of the items are already owned and which remain to be purchased.

Figure 6:
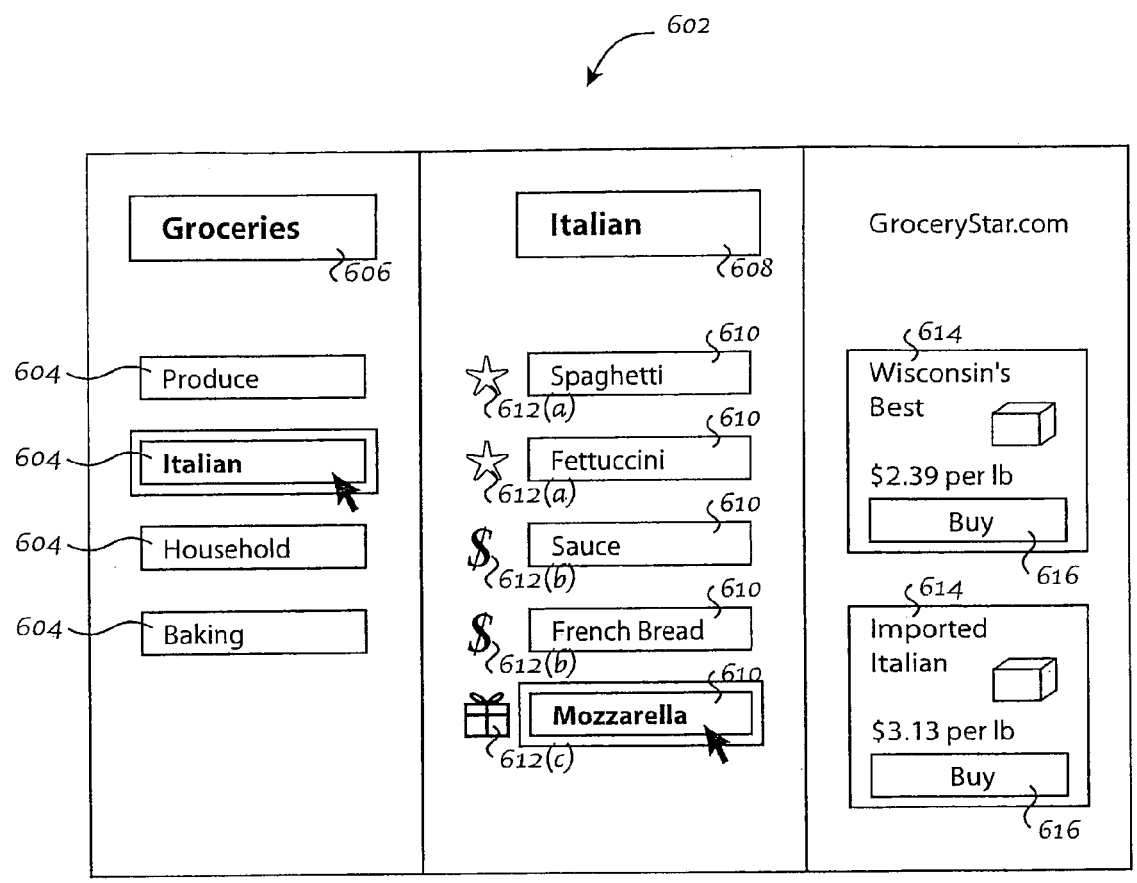
FIG. 6 displays a user interface according to an alternate embodiment of the present invention.

From the above, those skilled in the art will recognize that the present invention can be used to manage inventory of virtually any type of goods or services. With reference now to FIG. 6, another exemplary embodiment of the invention is disclosed. The present embodiment includes a customized user interface 602 useful for managing grocery inventory in a home. The user interface can be organized in any manner which is useful to the particular user. For example if a user tends to mentally group items such as pasta, sauce, bread, and cheese, a list can be created to group these items together. Alternatively, the user might want to group items based on where in the house they are stored. Again, lists can be developed to categorize items in this way.

With continued reference to FIG. 6, the user interface 602 generates a display of user defined categories 604. A heading 606 identifies the user interface 602 as pertaining to groceries generally. Selecting one of the categories causes that category name to be displayed as a list heading 608 having displayed there below a list of items 610 within that category. As with the previously described embodiment each displayed item 610 has associated with it a status icon 612 which identifies the status of the item 610. For example, an item which is owned is identified by a first icon 612(*a*), while an item which needs to be purchased is identified by a second icon 612(*b*). Furthermore, a third icon 612(*c*) might represent the item as having been purchased but not yet received.

With continued reference to FIG. 6, by selecting from the list an item 610 which needs to be purchased, information regarding that item will appear in one or more item description windows 614 within the user interface 602. For example, if an item 610 entitled "mozzarella", which needs to be purchased, is selected, a window 614 corresponding to a particular brand of mozzarella will be displayed along with price and other information. A visual display might also be displayed such as might be found on packaging of a product, or perhaps a picture of the product. More than one such window 614 can be displayed in order to give the user a selection from which to choose when making a purchase. The window 614 preferably includes a "buy" button 616, selection of which will initiate an on-line purchase of the item. The vendor used for purchase of the item can be one of several on-line grocery store chains which can, in some cases, deliver goods free of charge to the user's home. The choice of such on-line grocery store chains can be preprogrammed by the user or can be set by default to an address of a reputable on-line grocer.

In order to maintain a current inventory, as a user uses the last of a particular item, or notices that the item is getting to a low level, he or she can select the status icon 612 for that item 610 causing it to change sequentially among the two or three available states. For example, if the user uses the last of the available coffee, he or she can select the status icon 612(*b*). The status icon will change from an "owned" state 612(*a*) to a "buy" state 612(*b*). Later, when the item is purchased, the status icon 612(*b*) will automatically change to the "purchased but not received" state 612(*c*), until such time as the product is received. When the product is received, the status icon 612(*c*) will change to the "owned" state, either by the user selecting the icon 612 or by a remote action of the grocery vendor. While the present invention has been described in terms of being used with an on-line grocery vendor, those skilled in the art will recognize that the present invention can also be used to maintain an inventory of groceries supplied by a traditional grocery vendor, not on-line. In addition, the present invention can be used to maintain an inventory of virtually any kind of items, such as for example toys or books.

The present invention contemplates that the status of each item might not be merely binary (i.e. owned or un-owned) but may be some intermediate state. For example, the item 410 (FIG. 4) of the previously described embodiment might be licensed for a limited time or might be licensed on a particular platform. Or, the user might have only a small amount of an item 610 (FIG. 6), such as, for instance, ¼ cup of sauce. The present invention can be adapted to provide an indication of such an intermediate status.

It will be appreciated that the activity of purchasing each item can be done directly from the user interface each time an item is used up. The purchases can be tallied in an account (not shown) which can be checked at any time to determine the amount charged. By way of example, a user can periodically select and purchase items as they are used up, and schedule a delivery for a predetermined time. The delivery will then include all items purchased up to that point. This avoids the difficulty and embarrassment, sometimes experienced with traditional grocery shopping wherein a grocery cart is filled and brought to a checkout stand only to find that the amount exceeds that which the buyer is willing or able to pay. The present invention allows purchases to be made incrementally and directly without the use of a physical or electronic grocery cart.

Figure 7:
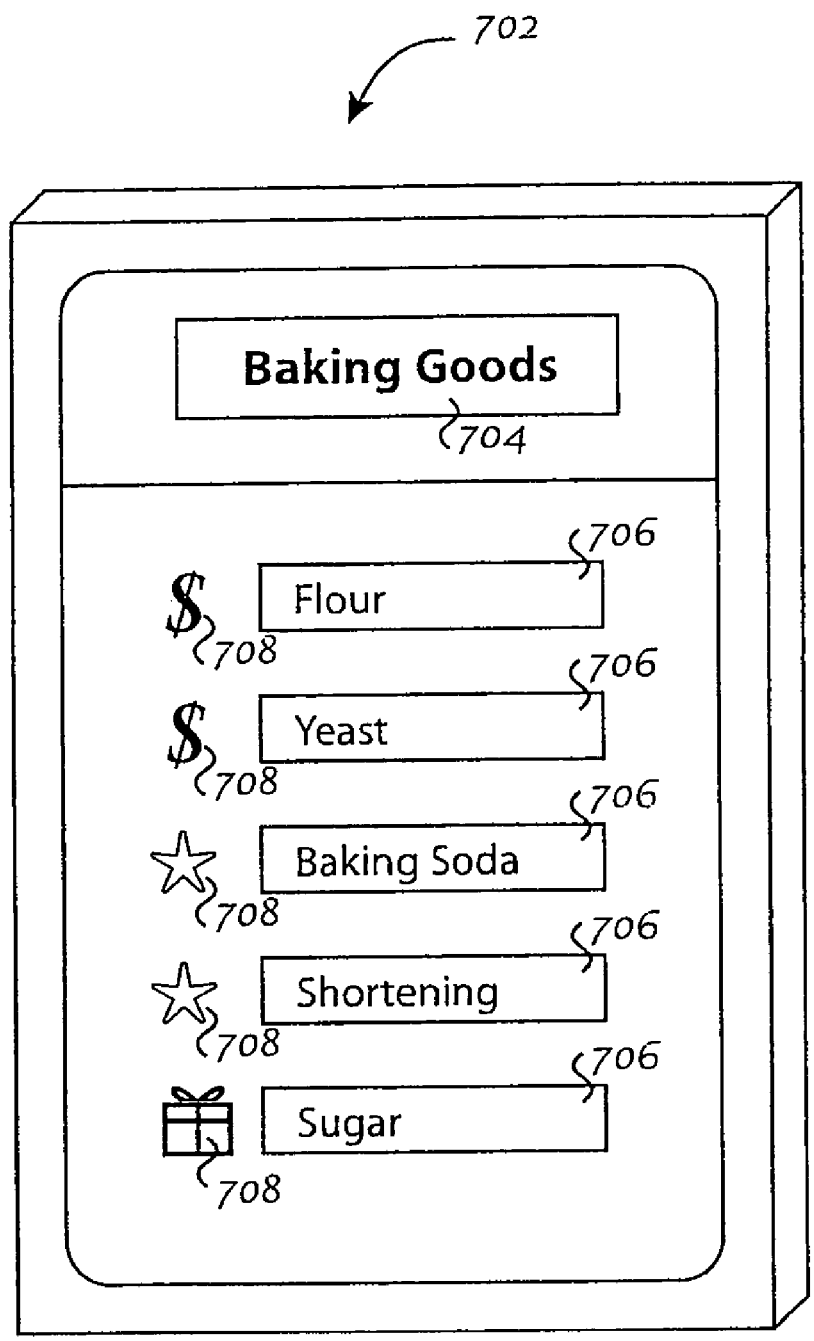
FIG. 7 is a perspective view of an electronic checklist for use with an embodiment of the present invention.

With reference to FIG. 7, a portable electronic checklist can be used to maintain the inventory of groceries in the user interface 602 (FIG. 6). The portable user interface can be hung on a pantry door or incorporated into a refrigerator door so as to be easily accessible when supply of an item is found to be low. The electronic checklist 702 includes a category heading 704 which corresponds to the headings 608 of the user interface 602 (FIG. 6). When the user touches the heading 704, it changes from one heading to another in series until a desired heading is found. Each heading display generates a corresponding list of items 706 there below corresponding to the items 610 in the user interface. When supply of an item is found to be low or the item is used up all together, the user simply touches that item in the screen. The screen is linked with the user's computer system 210 (FIG. 2), or directly to a vendor supply database, so that the user interface 702 will be updated to indicate that the item needs to be purchased. The link can be a remote link or can simply be through the manual transfer of a computer readable medium, such as a floppy disk, between the electronic checklist 702 and the computer system 210. The checklist 702 may also include status icons 708 indicating the ownership status reflected in the user interface 602.

In yet another embodiment of the invention, inventory can be kept automatically. Various sensors in a pantry and/or refrigerator (not shown) can sense when an item needs to be replaced. This sensed condition is then delivered to the computer system 210 (FIG. 2) whereby the interface 602 (FIG. 6) is automatically updated to reflect the changed ownership status of the item.

With reference again to FIG. 6, the list categorizations are transferable from one remote user to another. For example, the user may have a friend who has a recipe that the user wants to try. The friend can email the recipe to the user as a grocery category 606 with all of the ingredients being listed as items 610. The user can easily enter this recipe into the user interface 602 so that by selecting the recipe as a desired category, the name of the recipe will appear as the list heading with the various ingredients appearing there below as items 610. The interface will automatically determine the ownership status of each item/ingredient 610 which will be reflected in the status icons 612.

Figure 8:
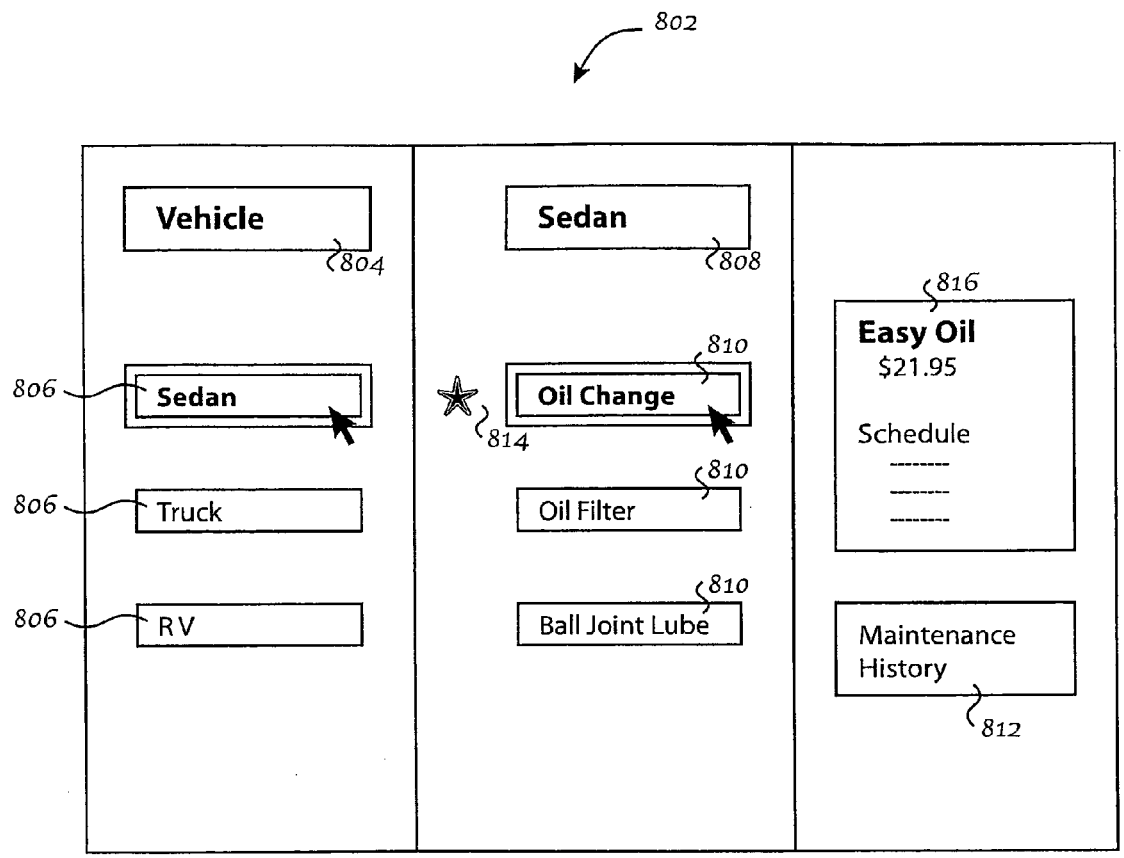
FIG. 8 displays a user interface according to yet another embodiment of the present invention.

With reference now to FIG. 8, a user interface 802 for managing vehicle maintenance is disclosed. The user interface includes a heading 804 which identifies the user interface as pertaining to vehicle maintenance. Below the heading 804 is a list of vehicles 806 owned by the user. Selecting a vehicle 806 will cause that vehicle to appear as a vehicle heading 808, below which will be displayed various maintenance procedures 810 which are part of that vehicle's maintenance routine. By selecting one of the procedures 810, information regarding that procedure, such as when that procedure was last performed and when it is due, will be displayed in a window 812. If a certain maintenance procedure needs to be performed on the vehicle, an icon 814 indicating as much will appear beside that procedure.

With continued reference to FIG. 8, when a certain procedure is selected, a description of one or more local service stations will appear in a window 816. The service station window includes information regarding that service station and can include a button to obtain schedule information and a link to the station to schedule an appointment.

The computer 210 (FIG. 2) can be electronically linked with the vehicle so that the vehicle mileage can be monitored. When the vehicle mileage reaches a point where a particular maintenance procedure is required, the icon 814 will appear. In addition, the interface 802 can be programmed to alert the user by sending an email or by displaying a message to the user external from the user interface 804 to let the user know that a maintenance procedure should be performed. It will be appreciated that the present embodiment will be useful, not only to private individuals but also to businesses which operate a fleet of vehicles.

In summary the present invention provides a system for greatly simplifying a user's life by including a single interface from which a user can easily identify both items or services which are currently owned and those that need to be purchased, and from which he or she can make those required purchases. The system conforms to the user's lifestyle providing seamless, inventory maintenance and purchasing without the need for an electronic or actual shopping cart.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method comprising:
  storing a list of inventory items;
  generating a user interface;
  displaying the list of inventory items on the user interface;
  determining whether each item in the list of inventory items is owned or un-owned, and further determining whether there is an intermediate supply of at least some of the items; and
  providing an indication on the user interface of whether particular items are owned or un-owned, and an indication of the intermediate supply of at least some of the items.

2. The method as recited in claim 1, further comprising providing a mechanism to allow a user to initiate a purchase of at least one un-owned item in the inventory list.

3. The method as recited in claim 1, further comprising providing a link displayed on the user interface to an on-line vendor from which a user can purchase at least one un-owned item in the inventory list.

4. The method as recited in claim 1, wherein the indication on the user interface of whether each item is owned or un-owned comprises a status icon.

5. The method as recited in claim 1, wherein determining whether each item in the list of inventory items is owned or un-owned includes receiving a signal from an automatic sensor configured to sense when an item in the list of inventory items needs to be replaced.

6. The method as recited in claim 1, wherein the list of inventory items is received via the internet.

7. The method as recited in claim 1, further comprising providing a link displayed on the user interface to an on-line vendor from which a user can purchase at least one un-owned item in the inventory list, and wherein the indication on the user interface of whether each item is owned or un-owned comprises a status icon.

8. The method as recited in claim 7, wherein determining whether each item in the list of inventory items is owned or un-owned includes receiving a signal from an automatic sensor configured to sense when an item in the list of inventory items needs to be replaced.

9. A computer readable memory medium storing instructions executable by a computer to:
  store a list of inventory items;
  generate a user interface;
  display the list of inventory items on the user interface;
  determine whether each item in the list of inventory items is owned or un-owned, and further to determine that there is an intermediate supply of at least some of the items; and
  provide an indication on the user interface of whether particular items are owned or un-owned, and an indication of the intermediate supply of at least some of the items.

10. The computer readable memory medium as recited in claim 9, wherein the instructions are further executable to: provide a mechanism to allow a user to initiate a purchase of at least one un-owned item in the inventory list.

11. The computer readable memory medium as recited in claim 9, wherein the instructions are further executable to provide a link on the user interface to an on-line vendor from which a user can purchase at least one un-owned item in the inventory list.

12. The computer readable memory medium as recited in claim 9 wherein the indication on the user interface of whether each item is owned or un-owned comprises a status icon.

13. The computer readable memory medium as recited in claim 9, wherein the instructions are further executable to receive a signal from an automatic sensor configured to sense when an item in the list of inventory items needs to be replaced.

14. The computer readable memory medium as recited in claim 9, wherein the list of inventory items is received via the internet.

15. The computer readable memory medium as recited in claim 9, wherein the instructions are further executable to provide a link on the user interface to an on-line vendor from which a user can purchase at least one un-owned item in the inventory list, and wherein the indication on the user interface of whether each item is owned or un-owned comprises a status icon.

16. The computer readable memory medium as recited in claim 15, wherein the instructions are further executable to receive a signal from an automatic sensor configured to sense when an item in the list of inventory items needs to be replaced.

17. A computer system comprising:
a processor unit;
a memory including program instructions executable by the processor unit to:
 store a list of inventory items;
 generate a user interface;
 display the list of inventory items on the user interface;
 determine whether each item in the list of inventory items is owned or un-owned, and further to determine that there is an intermediate supply of at least some of the items; and
 provide an indication on the user interface of whether particular items are owned or un-owned, and an indication of the intermediate supply of at least some of the items; and
 an automatic sensor configured to sense when an item in the list of inventory items needs to be replaced;
wherein determining whether each item in the list of inventory items is owned or un-owned includes receiving a signal from the automatic sensor.

18. The system as recited in claim 17, wherein the instructions are further executable to:

provide a mechanism to allow a user to initiate a purchase of at least one un-owned item in the inventory list.

19. The system as recited in claim 18, wherein the instructions are further executable to provide a link on the user interface to an on-line vendor from which a user can purchase at least one un-owned item in the inventory list.

20. The system as recited in claim 18, wherein the indication on the user interface of whether each item is owned or un-owned comprises a status icon.

21. The system as recited in claim 18, wherein the list of inventory items is received via the internet.

* * * * *

UNITED STATES PATENT AND TRADEMARK OFFICE
CERTIFICATE OF CORRECTION

PATENT NO.        : 7,321,093 B2                                        Page 1 of 1
APPLICATION NO.   : 11/512894
DATED             : January 22, 2008
INVENTOR(S)       : Eric J. Gould et al.

It is certified that error appears in the above-identified patent and that said Letters Patent is hereby corrected as shown below:

Title Page:

Item (75) Inventors:
Please delete "Alice Cark" and substitute --Alice Clark--.

Signed and Sealed this

Twenty-third Day of February, 2010

David J. Kappos
*Director of the United States Patent and Trademark Office*